United States Patent [19]
Adams et al.

[11] Patent Number: 5,392,329
[45] Date of Patent: Feb. 21, 1995

[54] AUTOMATIC CALL DISTRIBUTION SYSTEM WITH EMERGENCY RECORDING SYSTEM AND METHOD

[75] Inventors: David J. Adams, Warrenville; Brian J. Shapley, Woodridge, both of Ill.; Pramela M. Ittoop, Troy, Mich.

[73] Assignee: Rockwell International Corporation, El Segundo, Calif.

[21] Appl. No.: 966,989

[22] Filed: Oct. 27, 1992

[51] Int. Cl.[6] .................................... H04M 11/00
[52] U.S. Cl. .................................. 379/49; 379/45; 379/84
[58] Field of Search .................. 379/45, 51, 49, 88, 379/214, 201, 210, 211, 212, 218, 84, 265, 266, 309

[56] References Cited

U.S. PATENT DOCUMENTS

| | | | |
|---|---|---|---|
| 4,891,835 | 1/1990 | Leung et al. | 379/45 |
| 4,893,325 | 1/1990 | Pankonen et al. | 379/45 |
| 5,077,788 | 12/1991 | Cook et al. | 379/45 |
| 5,163,082 | 11/1992 | Karnowski | 379/88 |
| 5,224,153 | 6/1993 | Katz | 379/88 |
| 5,241,586 | 8/1993 | Wilson et al. | 379/88 |

FOREIGN PATENT DOCUMENTS 0070856  4/1985  Japan ..................... 379/45

OTHER PUBLICATIONS

"ACD, Automatic Call Distributor", Datapoint Corporation Mar. 1983.
"E911 Public Safety Answering Point..." Bell Comm. Research Nov. 1987.

Primary Examiner—Curtis Kuntz
Assistant Examiner—Stella L. Woo
Attorney, Agent, or Firm—C. B. Patti; H. F. Hamann

[57] ABSTRACT

An automatic call distribution system (10) with a multiport switch (12) which selectively interconnects telephonic units (16) of an internal network with a plurality of external units (13) of an external telephonic network (14) having an emergency recording system (11) with at least one recorder (18) interconnected with a port of the switch (12), establishing an informational group of units (14), an emergency key (32) on the console (30) of the unit (16) for requesting the recording of a call connected with the unit (16) in which a recorder (18) from a corresponding group is assigned to record the call at the requesting unit (16).

45 Claims, 8 Drawing Sheets

```
                                                           50
                                                         /
 BIT  15 14 13 12 11 10 9  8  7  6  5  4  3  2  1  0
 WORD +--+--+--+--+--+--+--+--+--+--+--+--+--+--+--+--+
  1   :CM CHKPT FLAGS:STBY: *     :   TERMINATION TYPE     :
      +--+--+--+--+--+--+--+--+--+--+--+--+--+--+--+--+
  2   :   INFORMATION GROUP NUMBER   :  LINE PROTOCOL POINTER :
      +--+--+--+--+--+--+--+--+--+--+--+--+--+--+--+--+
  3   :                     *                          :
      +--+--+--+--+--+--+--+--+--+--+--+--+--+--+--+--+
  4   :                     *                          :
      +--+--+--+--+--+--+--+--+--+--+--+--+--+--+--+--+
  5   :                     :ECHO CNTR: SIGNALING TYPE :
      +--+--+--+--+--+--+--+--+--+--+--+--+--+--+--+--+
  6   :                     *                          :
      +--+--+--+--+--+--+--+--+--+--+--+--+--+--+--+--+
  7   :                     *                          :
      +--+--+--+--+--+--+--+--+--+--+--+--+--+--+--+--+
  8   :                     *                          :
      +--+--+--+--+--+--+--+--+--+--+--+--+--+--+--+--+
  9   :                     *                          :
      +--+--+--+--+--+--+--+--+--+--+--+--+--+--+--+--+
 10   :            TERMINATION'S ATTRIBUTES             :
      +--+--+--+--+--+--+--+--+--+--+--+--+--+--+--+--+
 11   :   CURRENT SIGNALING STATE     :LTOF: CURRENT PROCESSING STATE:
      +--+--+--+--+--+--+--+--+--+--+--+--+--+--+--+--+
 12   :        PARTY B PORT ID                          :
      +--+--+--+--+--+--+--+--+--+--+--+--+--+--+--+--+
 13   :        PARTY C PORT ID                          :
      +--+--+--+--+--+--+--+--+--+--+--+--+--+--+--+--+
 14   :  NEXT AVAILABLE TRUNK SIGNALING RECORDER FOR THIS I-GROUP :
      +--+--+--+--+--+--+--+--+--+--+--+--+--+--+--+--+
 15   :  PREVIOUS AVAILABLE TRUNK SIGNALING RECORDER FOR THIS I-GROUP :
      +--+--+--+--+--+--+--+--+--+--+--+--+--+--+--+--+
 17   :          LIST BIN NUMBER                        :
      +--+--+--+--+--+--+--+--+--+--+--+--+--+--+--+--+
 18   :          TIME OF LAST EVENT                     :
      +--+--+--+--+--+--+--+--+--+--+--+--+--+--+--+--+
 19   :                     *                          :
      +--+--+--+--+--+--+--+--+--+--+--+--+--+--+--+--+
 20   :                     *                          :
      +--+--+--+--+--+--+--+--+--+--+--+--+--+--+--+--+
 21   :                     *                          :
      +--+--+--+--+--+--+--+--+--+--+--+--+--+--+--+--+
 22   :                     *                          :
      +--+--+--+--+--+--+--+--+--+--+--+--+--+--+--+--+
 23   :                     *                          :
      +--+--+--+--+--+--+--+--+--+--+--+--+--+--+--+--+
 24   :                     *                          :
```

AUTOMATIC CALL DISTRIBUTION SYSTEM WITH EMERGENCY RECORDING SYSTEM AND METHOD

BACKGROUND OF THE INVENTION

1. Field of the Invention

This invention relates generally to an automatic telephone call distributor system and, more particularly, to an automatic call distributor system with an emergency recording system having at least one recorder for selectively recording multiple calls from multiple internal telephonic units of an internal telephonic network and a method of recording emergency messages.

2. Description of the Related Art Including Information Disclosed Under 37 C.F.R. ∫1.97–1.99

Automatic call distributors employing a switch controlled by a central processing unit for selectively interconnecting a plurality of external units of an external telephonic network with a total plurality of internal units of an internal network of the call distributor are well known. Examples are shown in U.S. patent application Ser. No. 07/770,197 of Jones et al., filed Oct. 2, 1991 entitled "Multichannel Telephonic Switching Network With Different Signaling Formats and Connect/PBX Treatment Selectable For Each Channel"; U.S. Pat. No. 5,140,611 of Jones et al., issued Aug. 18, 1992 entitled "Pulse Modulated Self-Clocking and Self-Synchronizing Data Transmission and Method For a Telephonic Communication Switching System" and U.S. Pat. No. 5,127,004 of Lenihan et al., issued Jun. 30, 1992 entitled "Tone and Announcement Message Code Generator For a Telephonic Switching System and Method".

It is also known in such distributors to use a recording device to record nuisance, threatening or emergency calls. Often, a recorder in the known systems is activated by actuating a key switch on the console of the internal telephonic unit requesting a call to be recorded. A backup recording device is optionally available to be used if a failure is detected on the first recorder. Disadvantageously, however, if the recording device is already in use, additional emergency calls will not be recorded.

In known systems, the operators of the internal telephonic units are often stationed at locations remote from the recording device used to record emergency calls. Consequently, the recordings cannot be played back to the operators at the remote sites. Additionally, in known systems, the emergency messages are recorded on mechanical tape recorders prone to mechanical wear and resultant failure. When these tape recorders are taken out of service to be repaired they are not capable of recording calls. Since, only one system recorder and one backup recorder are used in known systems, the relative use of the recorders is inflexible and limited, since only one call can be recorded at a time. Moreover, since the system recorder is shared among all the operators of the call distributor system, there are no groups of recorders which correspond to different groups of operators handling different types of calls. Thus, all the different types of recorded calls are recorded at only one location at the system, and it is difficult to correlate the recorded messages with the different types of recorded calls, the types of operator (i.e. agent, supervisor, trainee) and the identity of the internal unit requesting the recording.

SUMMARY OF THE INVENTION

It is therefore the principal object of the present invention to provide an automatic call distribution system with an emergency recording system and a method which overcomes the above disadvantages of known systems by providing selected relationships between the internal units and at least one recorder and by automatically storing information about the recorded messages.

This object is achieved in part by providing an automatic call distribution system having a multiport switch for selectively interconnecting a total plurality of internal units of an internal network with a plurality of external units of an external telephonic network with an emergency recording system having at least one recorder interconnected with at least a port of the multiport switch, means for selectively establishing at least one informational group of the internal units lesser in number than the total plurality of internal units, means for selectively associating the at least one informational group with the at least one recorder, means associated with at least one of the units of the informational group of internal units for requesting recording of a call at the requesting unit and means responsive to a request for recording from one of the internal units of the informational group of units associated with the at least one recorder to selectively assign the at least one recorder to the one internal unit.

In the preferred embodiment there are multiple groups of recorders each with multiple recorders and the assignments of selected informational groups to selected recorder groups is based on physical proximity between the groups.

The object of the invention is also achieved by providing an automatic call distribution system having a multiport switch for selectively interconnecting a total plurality of internal units of an internal network with a plurality of external units of an external telephonic network with an emergency recording system having a plurality of recorders for recording incoming calls from external units, means for selectively interconnecting available ones of the plurality of recorders upon request to selected ones of the plurality of internal units and means for storing information concerning the recording of a call in response to the request for recording by the selected ones of the plurality of internal units.

In the preferred embodiment, the information emergency message includes the time the recording was requested, the telephone number of the requesting internal unit, a port identification number of the requesting internal unit, and a recorder port identification number of the recorder which records the call.

The objective is also partly achieved by providing a method of recording emergency calls in an automatic call distribution system having a multiport switch for selectively interconnecting a total plurality of internal units of an internal telephonic network with a plurality of external units of an external telephonic network, comprising the steps of (1) selectively establishing at least one informational group of internal units lesser in number than the total plurality of internal units, (2) selectively associating at least one recorder with at least one informational group, (3) requesting recording of a call at an internal unit and (4) selectively assigning the at least one recorder to the internal unit requesting recording in response to the request for recording only if the internal unit requesting the recording is in the informational group associated with the at least one recorder.

The objective of the invention is also obtained partly by providing a method in an automatic call distribution system having a multiport switch controlled by a central processing unit for selectively interconnecting a total plurality of units of an internal telephonic network with a plurality of external telephonic units of an external network of recording emergency calls comprising the steps of (1) selectively recording incoming calls from external units on a plurality of recorders, and (2) automatically storing an emergency message relating to the recording of the call in response to the request for recording at the requesting unit.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
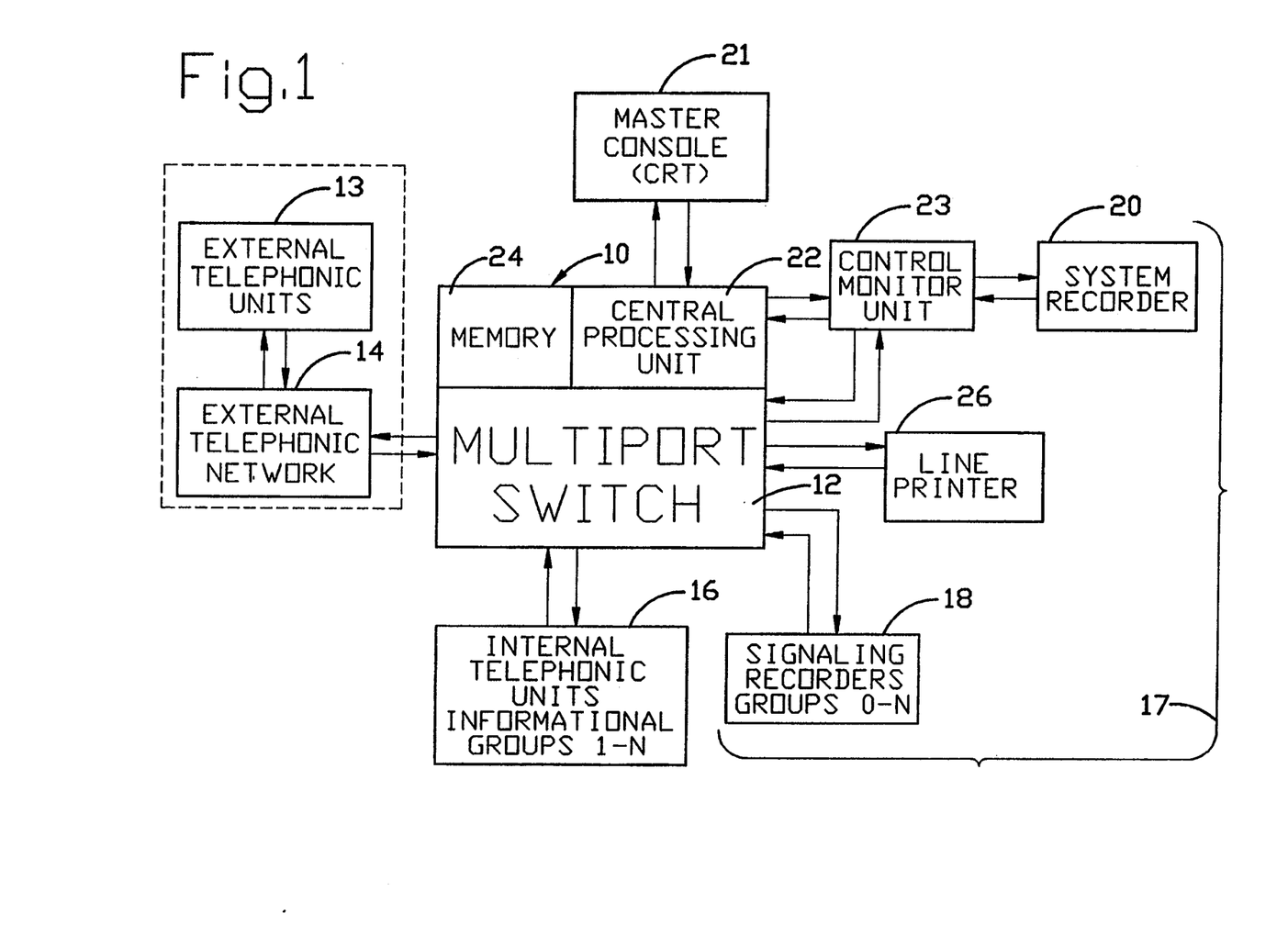
FIG. 1 is a functional block diagram of the preferred embodiment illustrating the automatic call distributor with the emergency recording system of the present invention as interconnected with a known external network of external units.

Referring to FIG. 1, the preferred embodiment of the automatic call distributor 10 includes a multiport switch 12 controlled by a central processing unit 22 operating in conjunction with a memory 24 to selectively interconnect a plurality of external telephonic units 13 of an external telephonic network 14 with a plurality of internal telephonic units 16 1-N of an internal telephonic network defined by the automatic call distributor 10 and the plurality of internal telephonic units 16. The central processing unit 22 is preferably a DEC PDP 11/34, 11/44, 11/84 or 11/94, manufactured by the Digital Equipment Corporation. The multiport switch has more than three thousand I/O ports for connection to the internal telephonic units 16.

In accordance with the present invention the automatic call distributor 10 also includes an emergency recording system 17 which preferably has a plurality of signaling recorders 18 organized in 1-N groups, a system recorder 20 and a line printer 26 which are selectively interconnected with the internal telephonic units 16. Each of the 1-N groups of signaling recorders has at least one signaling recorder 18 and preferably a plurality of signaling recorders 18. Stored in memory 24 for each recorder is the port identification member of the port of the multiport switch 12 to which the signaling recorder 18 is connected as well as its group identification member. Likewise, stored in memory 24 for each of at least some and preferably all of the internal telephonic units 16 is an informational group member associating the internal telephonic unit 16 with one of 1-N informational groups. Preferably, there are a plurality of internal telephonic units 16 assigned to each informational group 1-N.

Also stored in memory 24 is code respectively associating each of the 1-N informational groups of internal telephonic units 16 with the groups 0-N signaling recorders 18. Advantageously, the assignment of each internal telephonic units 16 to one of the informational groups 0-N is selectively programmable, so that the assignments can be changed without changing the physical location or switch I/O port of the internal telephonic units 16. Likewise, the assignment of each of the plurality of signaling recorders 18 to one of the 0-N groups of recorders can be selectively programmed, so that the assignments can be changed and recorder group 0-N increased or decreased in size as desired, without changing the physical location or switch I/O port of the signaling recorders 18. Thus, if it is determined that a particular informational group has a greater recording need than another group, recorders can be taken from the other group and reassigned to the one group. Preferably, however, the assignment of recorders to an informational group is based on the physical proximity of the informational group and the signaling recorders.

In keeping with another aspect of the automatic call distributor is the provisions of several lapses of redundancy in the emergency recording. First, as noted, each group of signaling recorders 18 preferably has a plurality of recorders, so that even if another internal telephonic unit 16 of the same informational group is using one of the assigned group of signaling recorders, it is likely that another one of the signaling recorders will be available. If not, an overflow, or default, group of signaling recorders is provided to handle the recording requirements of any internal telephonic unit regardless of its informational group relationship if none of the recorders of its assigned group of signaling recorders is not available. As a final backup, if all the signaling recorders of the default group are also unavailable when a request for a recording is made, a system recorder 20 remains available for cassette tape recording. Unlike the signaling recorders, the system recorder 20 used in the preferred embodiment is a mechanical cassette tape recorder. Therefore, the multiport switch 12 is also general under the control of the central processing unit 22 for all other switching functions.

Generally, while the emergency recording system 20 of the present invention can be implemented in conjunction with numerous types and sizes of automatic call distributors, it is preferably employed in an automatic call distributor of the type shown in U.S. patent applications U.S. Ser. No. 07/770,197 of Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System" issued Aug. 18, 1992 and U.S. Pat. No. 5,127,004 of Lenihan et al. entitled "Tone and Announcement Message Code Generator for a Telephonic Switching System and Method" issued Jun. 30, 1992.

Figure 2:
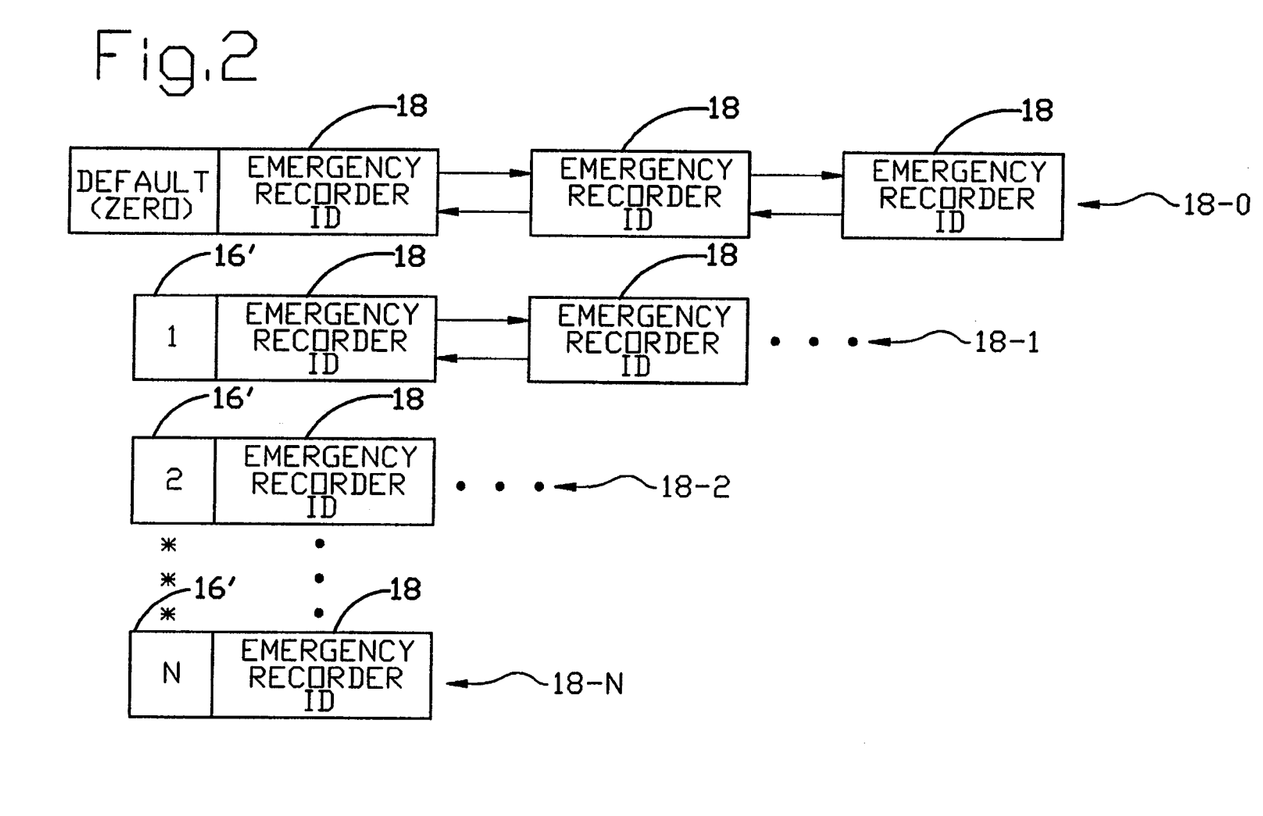
FIG. 2 is a block diagram illustrating different groups of message recorders in association with different informational groups 1-N.

Referring also to FIG. 2, the internal telephone units 16 are divided into 1-N informational groups 16, which have assigned to them 1-N groups of signaling recorders 18-1 through 18-N, respectively. In addition, there is a default group of recorders 18-0 which are not assigned to any of the informational groups 16' of internal telephonic units 16 but are assigned to a default, or zero, group which can be used by all internal telephonic units 16 regardless of their group, in a default situation. Through use of the master console 21, FIG. 1, groups can be arranged in any way desirable to the user of the system 10, but, as noted, preferably assignment of informational groups 16' is based on the physical proximity of the internal telephonic units 16 of the group to the recorders of the group 18-1 through 18-N. Alternatively, status of the agents or supervisors utilizing the different group of internal telephonic units 16 is used as a basis for assignment. The identification number of informational group 16' assigned to a recording unit group 18-1 through 18-N is preferably stored in the memory 24 of the automatic call distributor 10 after the assignment has been made.

Figure 3:
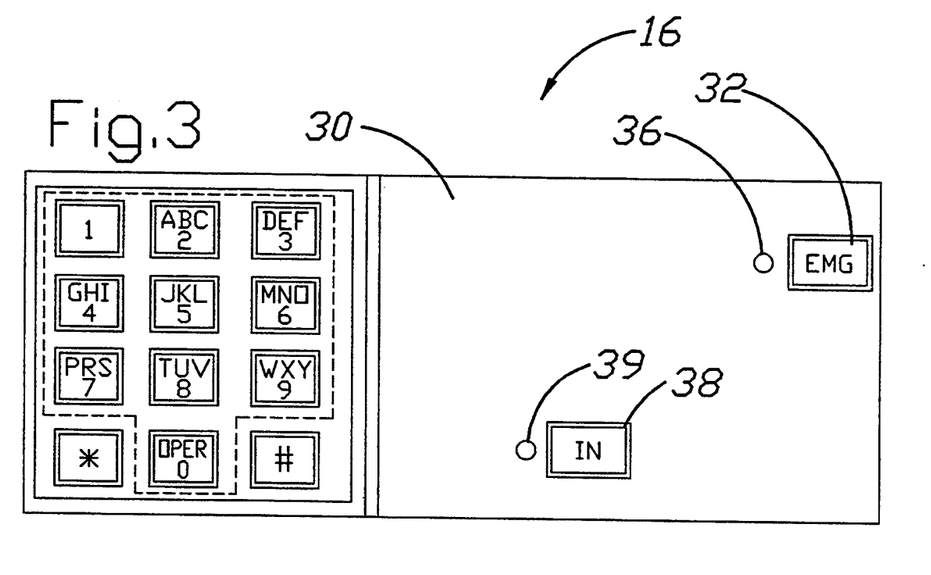
FIG. 3 is a simplified plan view of a console of an internal telephonic unit of the internal network of the automatic call distributor of FIG. 1.

Referring to FIG. 3, each of the internal telephonic units 16 preferably has a console 30 with an emergency key 32. The internal telephonic unit 16 also has an IN key 38 with an associated indicator lamp 39 which is lit in response to a call from an external telephonic unit 13 being connected to the internal telephonic unit 16 through multiport switch 12. An operator of the internal telephonic unit 16, such as an agent, depresses, or actuates, the emergency key 32 to request the recording of a call received from an external telephonic unit 13 at the requesting internal telephonic unit 16. In response to the request for recording by actuation of the emergency key 32, an available one of the signaling recorders 18 in the group 18-1 through 18-N preassigned to the 1-N informational group 16' of the requesting internal telephonic unit 16 is assigned to the internal telephonic unit 16 requesting the recording. The assigned signaling recorder 16 is then connected through switch 12 to the requesting internal telephonic unit 16 and records the call connected to the requesting unit 16.

The signaling recorders 18 are preferably digital storage devices responsive to control signals from and capable of providing status signals to the central processing unit 22. The signaling recorders 18 used in the preferred embodiment are those made by the OKI Electric Industry Company, Ltd. of Tokyo, Japan. The system recorders 18 are placed in the switch 12 matrix of the memory 24 having three thousand twenty-four words of address memory. The number of ports used to provide a recorder 18 is only limited by the number of the total three thousand twenty-four switch ports the user desires to allocate for recording. The recorders 18 are insertable to replace another signaling type device (such as an internal telephonic unit 16, trunk or a voice response unit, etc. not shown) connected to the switch. Therefore, the placement of the signaling recorder 18 in the switch 12 matrix of the memory 24 provides for the use of multiple recorders and increases recorder flexibility. The system recorder 20, on the other hand, is a cassette tape recorder which is connected to the processor matrix of the memory 24 having only one basic address for the system recorder. The system recorder 20 is connected to the central processing unit 22 through the control and monitor unit 23. The control and monitor unit 23 is an intermediate processor card connected in parallel with the central processing unit 22 and the multiport switch 12 which performs process signal synchronization and clocking functions. This limits the system recorder to this one address in the central processing unit 22 memory matrix.

An internal telephonic unit 16 is assigned an identification, or ID, number that is stored in the memory 24 that corresponds to a particular one of the 1-N informational groups. This informational group ID number also corresponds to a particular one of the 1-N groups 18-1 through 18-N of signaling recorders 18 having an associated ID in the memory 24. Each group of recorders 18-O through 18-N has at least one recorder 18 in the group and preferably has a plurality of recorders 18. In response to the operator actuating the emergency key 32, FIG. 3, the table of recorder IDs in memory 24 is accessed to determine whether a recorder from the group 18-O through 18-N of signaling recorders 18 corresponding to the informational group of the requesting unit 16 is available to record a call at the requesting telephonic unit 16. If a signaling recorder 18 in the recorder group of the informational group 16' of requesting internal telephonic unit 16 is available, and accessed, a suitable trunk signaling protocol accesses the recorder 18 and initiates establishment of a voice path between the selected recorder 18 and the requesting unit 16. Once the voice path is created, the signaling recorder 18 and requesting unit 16 are connected, and recording of the call is performed.

Referring again to FIG. 2, the recorders 18 groups are arranged in a queue. If a recorder 18 is not in use, it is placed in a queue of available recorders for a particular preselected informational group of units 16, FIG. 1. The queue is preferably a double linked list of available recorders respectively arranged as primary and backup recorders. The queue is preferably accessed on a last in, first out basis in order to provide a more uniform use of all the signaling recorders 18 in the group.

Among the groups of signaling recorders 18, is a common pool or group of recorders 18-O which is not assigned to any informational group of units 16. This common pool, the default or zero group seen in FIG. 2, is used by all the internal telephonic units 16 in the event neither a primary nor secondary recorder 18 of the assigned group of recorders 18-1 through 18-N is not available upon request. If no signaling recorders 18 are available in the assigned group 18-1 through 18-N upon request of the requesting unit 18 of a selected informational group 1-N then an available recorder 18 from the common pool, or group 18-O, is assigned to record the call at the requesting unit 16. Additionally, if the particular requesting unit 16 does not have an associated informational group, then a signaling recorder 18 from the common pool or group is selected to record at the requesting unit upon request. While the group 18-1 through 18-N are generally assigned selectively to informational groups 16 in close physical proximity, the common pool of recorders of group 18-O are preferably in a central location.

Referring to FIG. 3 again, the emergency lamp 36 which is lit in response to the actuation of the emergency key 32 to initiate recording of a call not only at the requesting internal telephonic unit 16, but also at all of the other internal telephonic units 16, such as supervisory internal telephonic units 16, which are also connected to the call being recorded. These other connected internal telephonic units 16 have their respective emergency lamps 36 lighted to indicate that a connected call is being recorded at one of the other internal telephonic units with which it is connected. Control of lighting the emergency lamps 36 of the other connected units 16 is achieved by means of an agent processing computer program of an event driven call processing program. This program is stored in memory 24 and determines what other internal telephonic units 16 are connected to the call at the requesting internal telephonic unit 16. This emergency recording program initiates the lighting of the other lamps 36, FIG. 2, when a call is being recorded at a requesting unit 16.

If a call is in the process of being recorded at an internal telephonic unit 16 with an illuminated emergency lamp 36, actuation of the emergency key 32 on the requesting internal telephonic unit 16 once again terminates the recording of the call. Again, the termination of the recording is initiated by the agent processing software of the event driven process program located in the switch 12 memory 24 of the call distributor 10, FIG. 1. In response to terminating the recording of the call by actuating the emergency key 32 on the requesting unit 16, the emergency lamp 36 on the console 30 of the requesting unit 16 is turned off to indicate that the recording of the call has ended. A signal is sent to the switch 12, FIG. 1, and the recorder 18 is placed back into the queue of its signaling recorder group 18-O through 18-N. The emergency recording program sends a signal to an emergency recorder processing program to place the selected recorders back in queue. The signaling recorder 18 is placed at the end of the queue for the corresponding informational group to the requesting unit 16.

Figure 4:
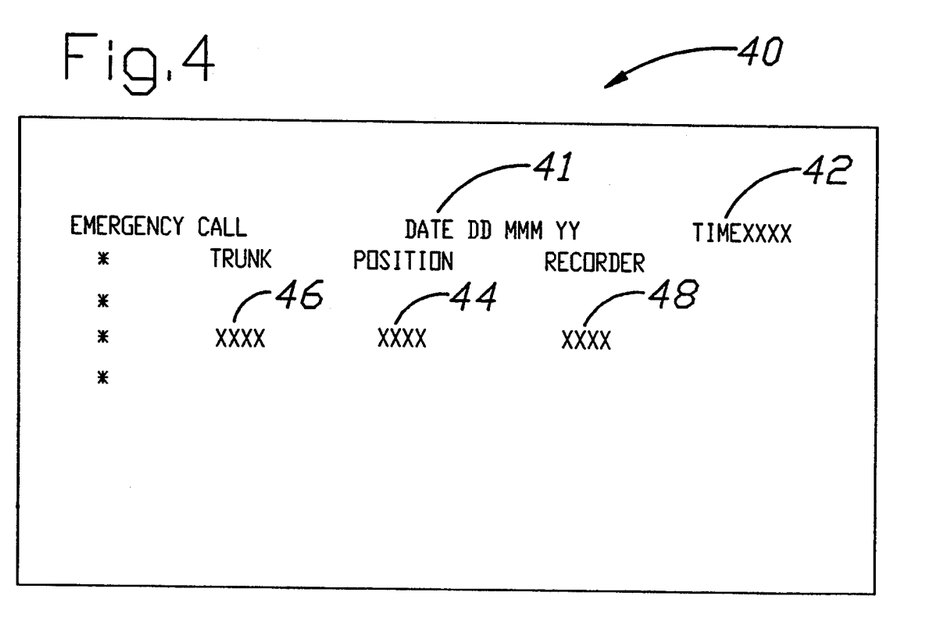
FIG. 4 is a preferred format for a line printer report provided by the line printer of the preferred embodiment of the automatic call distributor of FIG. 1.

If an emergency key 32 is actuated at an internal telephonic unit 16 which is connected to the recorded call but an internal telephonic unit 16 other than the original requesting internal telephonic unit 16, the emergency lamp 39 on the other internal telephonic unit 16 is turned off; however, recording of the call connected between the internal telephonic units 16 continues. Therefore, termination of recording of a call is controlled by the operator who initiated the recording at the requesting unit 16. The paper printer or line printer 26, FIG. 1, of the emergency recording system 17 which preferably prints out an emergency recording report 40, preferably in the format shown in FIG. 4, indicating that a request for recording of a call is being made at a requesting unit 16. As seen in FIG. 4 the emergency message or report 40 includes the time 42 when recording of the call was requested at the requesting unit 16, FIG. 1, the date 41 the recording was made, the telephone number 44 of the requesting internal telephonic unit, the trunk or port identification number 46 of the requesting internal telephonic unit and a recorder port identification number 48 of the signaling recorder 18 which records the call. If no recorder 18 is assigned to record a call, even though a request to record is made at a requesting unit 16, the recorder port identification number 48 is printed as zero to indicate that no recorder was assigned to record the call.

Additionally, an emergency signal is displayed at an assist or supervisor CRT screen (not shown) located at an internal telephonic unit 16 other than the requesting internal telephonic unit 16. Therefore, a supervisor at another internal telephonic unit 16 is alerted to an emergency situation which is being handled by an agent at the requesting internal telephonic unit 16.

Displaying of an emergency signal at a CRT of an internal telephonic unit 16 other than the requesting internal telephonic unit 16 is typically done when an off-duty supervisor of a group of agents notifies an on-duty supervisor to assist in the monitoring of the agents. This allows on-duty supervisors to provide assistance services to the agents of another informational group when that group supervisor is off-duty. The supervisor going off-duty enters the command OFF DUTY at the keyboard of the supervision internal telephonic unit. The agent or unit processing software directs all requests for assistance or emergency attention from a requesting internal telephonic unit 16 to the CRT screen of the on-duty supervisor.

Figure 6:
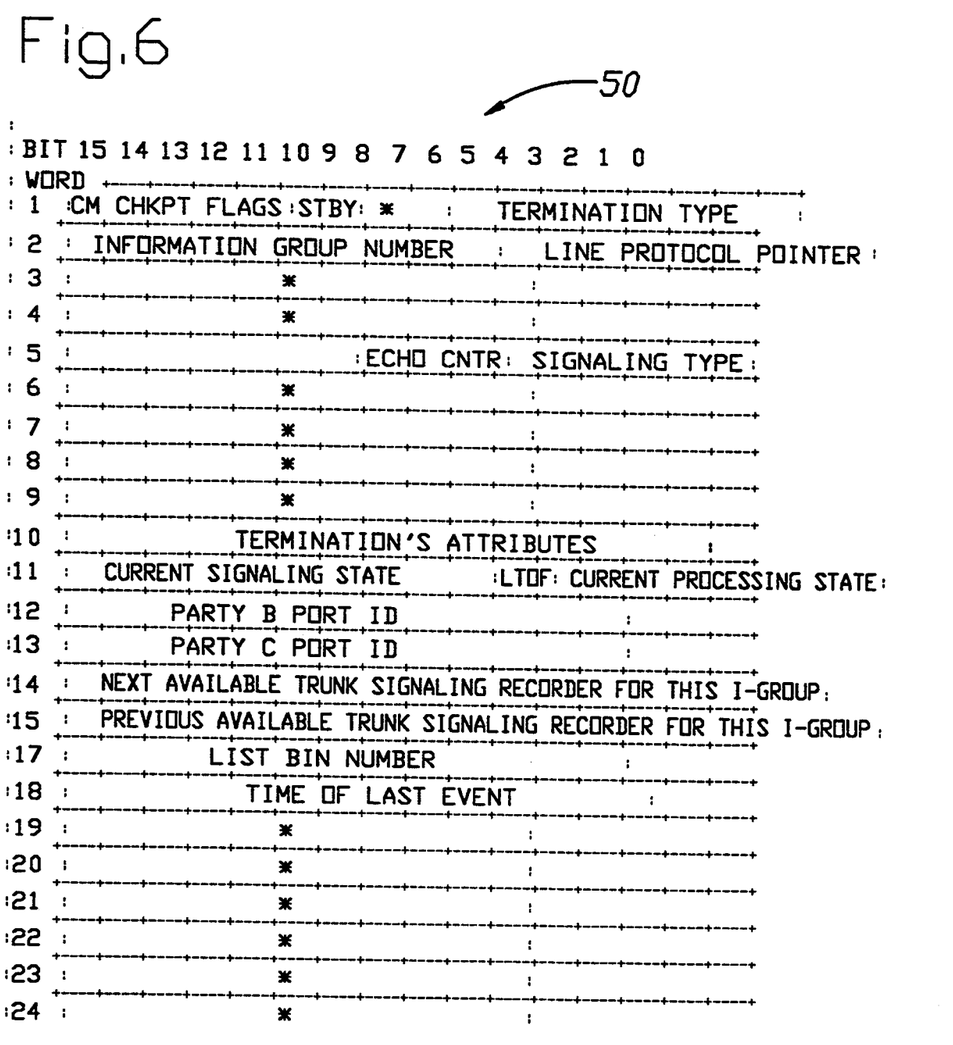
FIG. 6 illustrates a port termination table format for an emergency signaling recorder.

An operator or agent at a unit 16 actuates the emergency key 32, FIG. 3, to request the recording of a call upon detecting an emergency situation. Two steps are performed in the processing of the call in response to the actuation of the key 32. First, an emergency indicator bit in a port termination table 50, FIG. 6, is set for the requesting internal telephonic unit 16 in the memory 24, FIG. 1. FIG. 6 represents a port termination table 50 for a corresponding signaling recorder port. The port termination tables 50 are stored sections of memory 24 associated with each port which gives the status of the switch port in the emergency recording system 17. A port termination table exists in the memory 24 of the automatic call distributor 10 for each port of the multiport switch 12 connected to the internal telephonic units 16 and the recorders 18. The port termination table 50, FIG. 6, selectively includes information (i.e., informational group number ID of the unit, the ID of the port connected to the unit, the connected call trunk port ID, etc.). The port termination tables 50 for the switch ports of the preferred embodiment contain sixteen bits per word with a twenty-four word memory. The status of this information for the particular port changes in response to different events occurring on the port.

Next, a routine which selects a recorder, is scheduled for processing. After declaring an emergency condition is present, an emergency event is detected by the unit processing software stored in memory 24. If this emergency event is detected, the emergency indicator bit is checked in the port termination table to determine if the bit is set. If the emergency indicator bit is set, the ID of the recorder is stored in the port termination table 50, FIG. 6, for the requesting internal telephonic unit 16. If the bit is not set, a disconnect signal is sent to the corresponding recorder. The emergency recorder processing software initiates the recording of the call connected to the requesting internal telephonic unit 16.

This emergency recorder selection procedure additionally determines what type of recorder to use (system or signaling) and then makes an appropriate selection. Signaling recorders 18 are those recorders placed in queues, as seen in FIG. 3, which respond to different types of signal to initiate recording.

The system recorder 20, FIG. 1, is preferably a backup tape recorder and is used to record a call at the requesting unit 16 only if no signaling recorder 18 is selected and connected to record the call. First, the unit processing software signals the emergency recorder selection routine in the recorder processing software to check the recorder queues to obtain an available signaling recorder 18. Initially, the queue for the informational group, or I-Group, for the requesting internal telephonic unit 16 is checked. If there are no signaling recorders 18 available there, then the queue for the common pool of signaling recorders, group zero, FIG. 2, is checked. If no signaling recorders of the common pool are available, then finally the system recorder 20, FIG. 1, is checked to see if it is available. If a recorder (system or signaling) is successfully obtained, the emergency recorder routine sends a select event signal to that recorder with the ID of the requesting unit 16, FIG. 1. When a recorder 18 is successfully connected, it sends an emergency connect event signal via the switch 12 to the requesting unit 16 with the ID of the selected recorder. The emergency lamp 36 on the requesting unit 16, FIG. 2, turns on to indicate to the operator at the requesting unit that the call is being recorded. If no recorders (signaling or system) are available, the emergency recording request is denied, and the emergency report 40, FIG. 4, is sent with a recorder ID of zero. The emergency report 40 from the paper printer 26, FIG. 1, then shows zeros for the recorder port identification number 48, FIG. 3, to indicate that no emergency recorder was found. If the connect fails (i.e. the recorder in queue will not answer) the recorder processing software calls the emergency recorder routine with the ID and the informational group of the requesting unit 16 in order to attempt connection with another signaling recorder 18. The call distribution system 10 then puts the failed signaling recorder 18 out of service. A bit is set in the port termination table of the emergency recorder 18 to indicate that the recorder 18 is out of service and not in the queue.

As seen in FIG. 2 of the preferred embodiment, there are a plurality of different groups, or queues for the signaling emergency recorders 18. One queue is associated with each corresponding informational group of units 16, FIG. 1, and one queue corresponds to the general pool of signaling recorders 18, shown as group zero in FIG. 2. Each queue is operated on a last in, first out basis. Any the signaling types used in the preferred embodiment are E & M (Ear and Mouth Signaling), ES (Ear and Mouth Standard), EC (Ear and Mouth Calling), G3 (Ground Start D3), GS (Ground Start D2), RD (Ring Down) and LP (Loop Start).

The system recorder 20, FIG. 1, is outside these queues 18-O through 18-M, and is used only when there are no signaling recorders 18 accepting a request for emergency recording. The system recorder 20 is used as a last resort to record a call at the requesting unit 16 if the corresponding informational group and common pool group 18-O of signaling recorders 18 fail to record the call. Alternatively, a backup system recorder (not shown) is used in place of the initial system recorder 20, only if the system recorder 20 does not record the connected call at the requesting unit 16 due to a mechanical failure.

Figure 5:
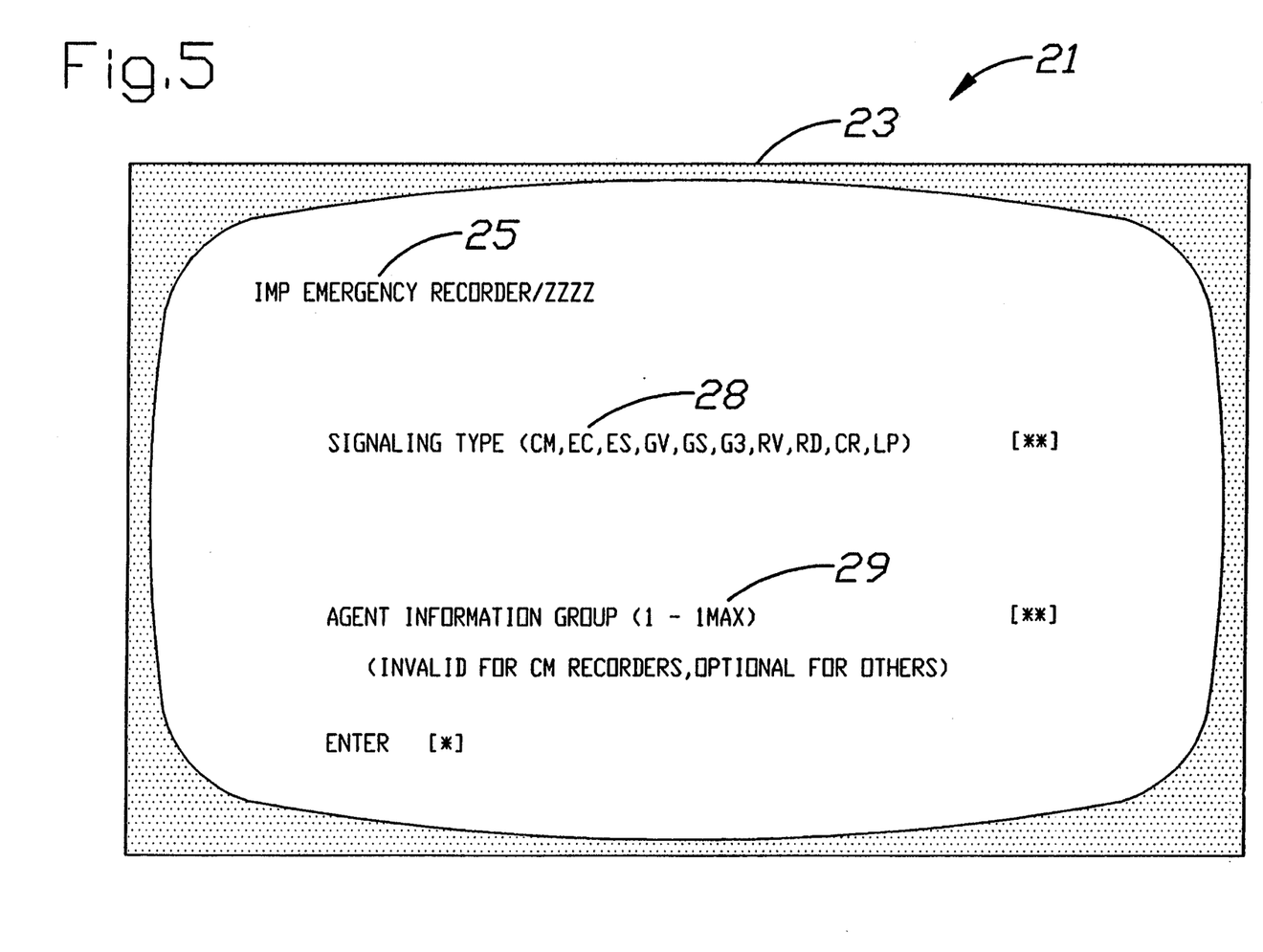
FIG. 5 illustrates an example of the information provided on a display screen of the master CRT of the automatic call distributor of FIG. 1 when a recorder is being added to the emergency recording system.

Referring to FIG. 5, a master console display, such as a CRT, 21 is shown displaying an Add Emergency Screen 23. The master console 21 is connected to a port of the switch 12, FIG. 1, and is used to program the central processing unit 22 of the automatic call distribution system 10 upon the insertion of a new recorder 18 into a queue. In response to the command, ADD EMERGENCY, being programmed into the master console 21, FIG. 5, the, Add Emergency display appears on the screen 23. The operator of the internal telephonic unit 16 associated with the master console 21 uses the Add Emergency display on screen 23 to indicate to the central processing unit 22 the selected type of recorder which is placed into queue. The ZZZZ prompt 25 of the screen 23 is used for the operator to insert the port ID for the port to which the inserted recorder is located and connected. This information is placed in the port termination table 50, FIG. 6, for the port of the inserted recorder in the memory 24. The type of recorder is selected at the SIGNALING TYPE prompt display 28, FIG. 5, on the screen 23.

In the preferred embodiment, among the types of signaling recorders 18, FIG. 1, selectively allowed into place in queue are: E&M (Ear and Mouth signaling), ES (Ear and Mouth standard), EC (Ear and Mouth calling), G3 (Ground start D3), GS (Ground Start D2), RD (Ring Down) and LP (Loop Start), as seen at the signaling type prompt 28, FIG.5. The CM selection at the signaling type prompt 28, FIG. 5, represents a system recorder 20, FIG. 1, instead of a signaling recording 18, and is therefore not a valid recorder for being placed in queue. Additionally, the informational group number prompt 29, FIG. 5, for the recorder which corresponds to an informational group of units 16, is displayed on the screen 23. The informational group assigned to the selected recorder is inserted into the informational group prompt 29, and stored in the memory 24. The port termination table 50, FIG. 6, thus has the informational group ID for the installed signaling recorder 18 which corresponds to a particular group of internal telephonic units 16.

While the advantages of the invention are preferably obtained with the automatic call distributor 10 described above with reference to FIGS. 1-5, the method of the invention can be practiced with other automated call distribution systems having a switch for selectively interconnecting a plurality of units of an internal telephonic network with a plurality of external units at an external telephonic network. In any event, the steps of the preferred method of practicing the invention of the emergency recording system 17, FIG. 1, comprise the steps of (1) selectively establishing at least one informational group of units 16, (2) selectively associating at least one recorder with at least one informational group, (3) requesting recording of a call at an internal unit 16, and (4) selectively assigning the at least one recorder 18 requesting recording in response to the request for recording only if the internal unit requesting the recording is in the informational group associated with the at least one recorder.

Figure 7A:
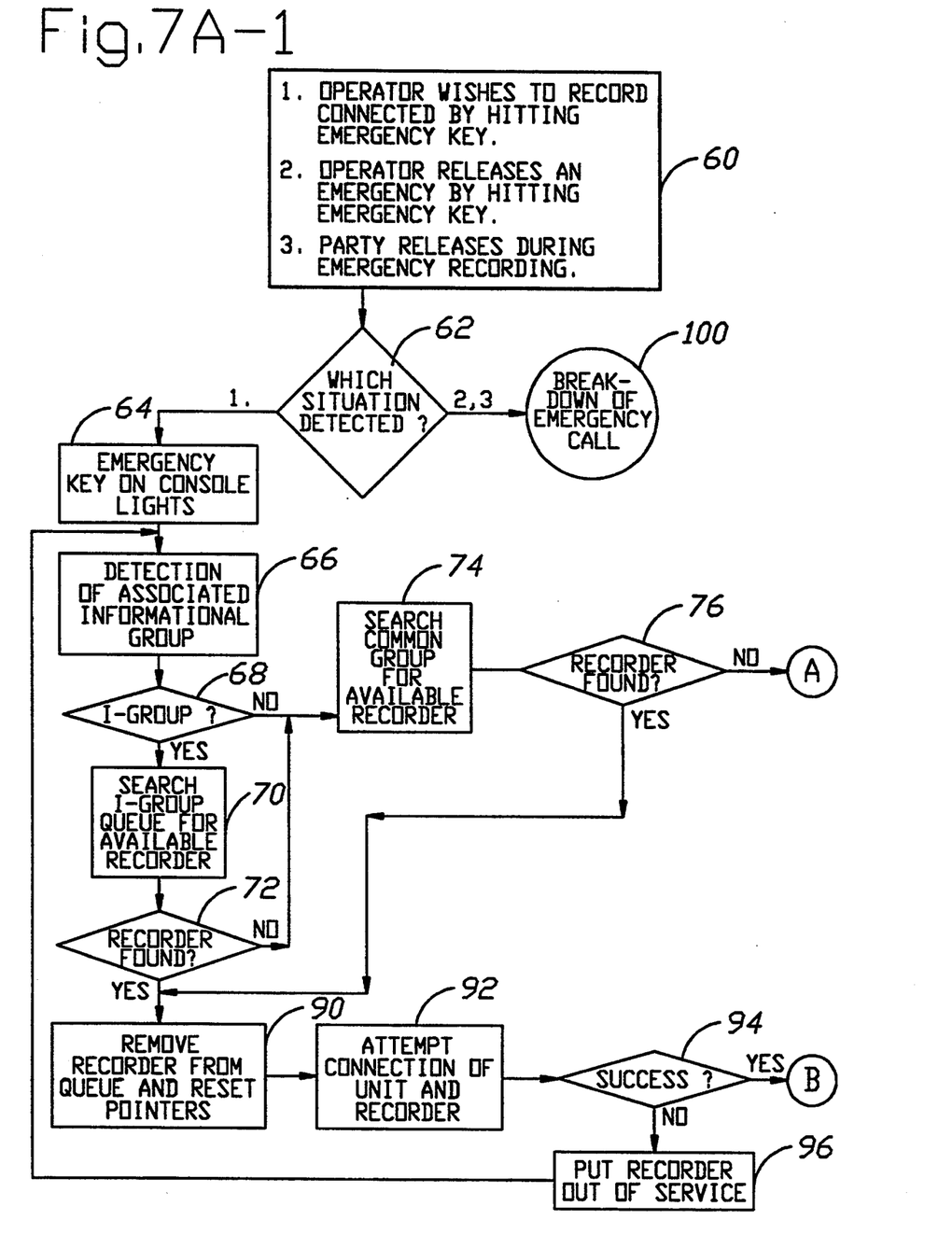
FIG. 7A is a flow chart of the preferred steps of initiating recording of an emergency call in the automatic call distributor of FIG. 1.
FIG. 7B is a flow chart of the preferred steps of releasing the recording of an emergency call in the automatic call distributor of FIG. 1.
Figure 7A:
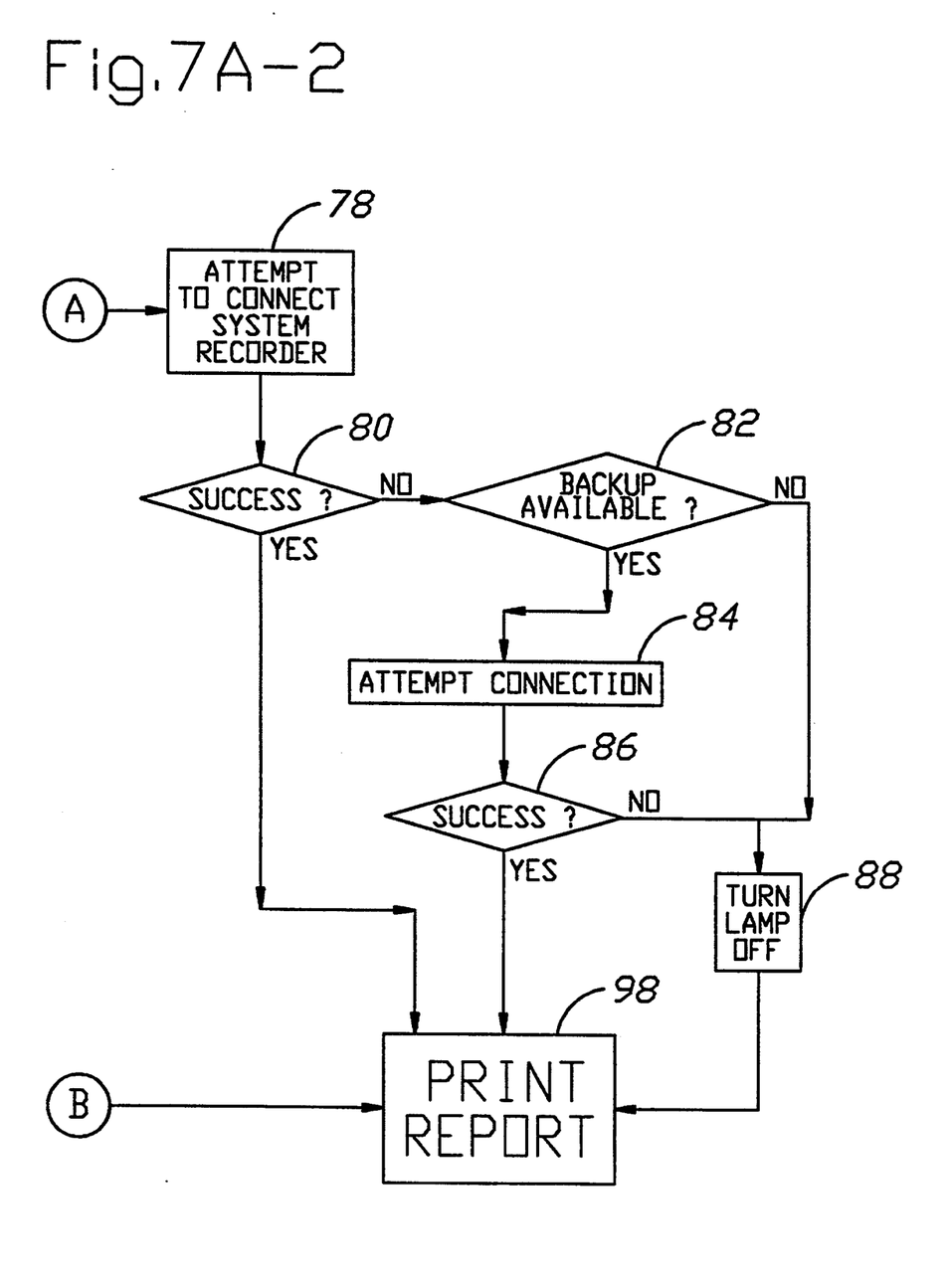

Referring to FIG. 7A, this method is preferably performed in the automatic call distributor 10, FIG. 1, by an operator actuating an emergency key 32, FIG. 3, to initiate recording of a call as seen in step 60. In step 64, FIG. 7A, the emergency lamp 36 on the console 30, FIG. 3, of the requesting unit 16 lights up in response to the depressing of the emergency key 32. Additionally, the emergency lamps 36 on the consoles 30 of all the other units 16 connected to the call at the requesting unit 16 are also lighted in response to the operator depressing the emergency key 32 at the requesting unit 16. This indicates to other operators, such as agents or supervisors, that the call to which they are connected to is being recorded. In step 66, in FIG. 6A, the central processing unit 22, FIG. 1, initiates the software in memory 24 of switch 12 to determine if there is an associated informational group, or I-group, corresponding to the particular requesting unit 16.

In step 68, FIG. 7A, the system 10 determines if there is an associated informational group for the requesting unit 16 by seeing if the requesting unit has an informational group ID in its respective port termination table. The signaling recorders 18, FIG. 2, are placed into groups. The groups of signaling recorders 18 are assigned to corresponding informational groups of units 16. The groups of signaling recorders 18, FIG. 2, are also arranged in queues. The queue of recorders for each group are arranged in a double linked list of available signaling recorders 18 as primary and back up recorders. A signaling recorder 18 is placed in the queue of available recorders when the recorder is not in use, and the queue is accessed on a last in, first out basis.

If the requesting unit 16 does not have an associated informational group then the call distributor system 10 searches the common group of signaling recorders 18 labeled zero at FIG. 2, for an available recorder, as seen in step 74, FIG. 7A. If the requesting unit 16, FIG. 1, has an associated informational group then the system 10 searches the queue of the group for signaling recorders 18 corresponding to the informational group to obtain an available signaling recorder, as seen in step 70 of FIG. 7A.

In step 72, the call distributor system 10 determines if a signaling recorder 18, FIG. 1, from the group is available. If no signaling recorder 18 from the corresponding informational group of signaling recorders is found to be available then in step 74 the system 10 searches the common group, group zero, FIG. 3, to see if a signaling recorder 18 from the common group is available to record.

In step 76, the system 10 searches the common group queue to determine if a recorder 18 is available from the common pool of recorders. If no available signaling recorder is found from the common or default group, as a last resort the switch 12 attempts to connect a system recorder 20, as seen in step 78 of FIG. 7A. In response to a successful connection to a system recorder 20, FIG. 1, in step 80, FIG. 7A, the call is recorded and a report or emergency message 40, FIG. 4, is printed at the line printer 26, FIG. 1, as seen in step 98, FIG. 7A. If no connection to the system recorder 20 is made in step 80, then the system 10 determines if there is a backup system recorder available in step 82. This is done by the central processing unit 22, FIG. 1., examining the recorder processing software in the memory 24 to see if there is a backup ID set.

The emergency lamp 36, FIG. 3, is turned off in step 88 if no backup system recorder is available, and a report 40, FIG. 4, is printed on the line printer 26, FIG. 1, in step 98. Zeros are displayed for the recorder port identification member 48, FIG. 4, to indicate that no recorder was found and connected to record the call at the requesting unit 16, FIG. 1.

If a backup system recorder is available, then an attempt to connect the backup system recorder (not shown) is made in step 84, FIG. 7A. In step 86, the system 10 determines if a successful connection to the backup system recorder is completed. An internal signal from the backup system recorder is made to the switch 12 indicating if a connection has been made. An unsuccessful connection results in turning off the emergency lamp 36, step 88, and printing out a report, step 98, FIG. 7A. If a successful connection to a backup system recorder is completed, the call at the requesting unit 16 is recorded and a report 40, FIG. 4, is printed at the line printer 26 as seen in step 98, FIG. 7A.

In response to an available recorder being found either from the common group, step 76, FIG. 7A, or from a group of recorders having a corresponding informational group, step 72, a signaling recorder 18 is removed from the queue of its group and the pointers are reset on the signaling recorder as is seen in step 90, FIG. 7A. The pointers are reset to keep the integrity of the last in first out queue thereby shifting the queue to the next available signaling recorder 18. Next, in step 92, FIG. 7A, an attempt to connect the requesting unit 16, FIG. 1, and the found signaling recorder 18 which is taken out of the queue is made. The switch 12 of the call distributor system 10 determines if the connection is accomplished in step 94 of FIG. 7A. If a successful connection is made, the call connected to the requesting unit 16 is recorded and an emergency report 40, FIG. 4, is printed at the line printer 26 in step 98, FIG. 7A. The emergency message or report 40, FIG. 4, printed at the line printer 26 includes the time the recording was requested 42, the date 41 which the recording was requested, the telephone number of the requesting unit 46, the requesting unit recorder port identification number of the recorder which the records the call 44. If no connection is made the signaling recorder 18, FIG. 1, is placed out of service in step 96, FIG. 7A, and the system 10 starts over and goes back to step 66, FIG. 7A, to again decide if there is an associated informational group for the particular requesting unit 16.

Figure 7B:
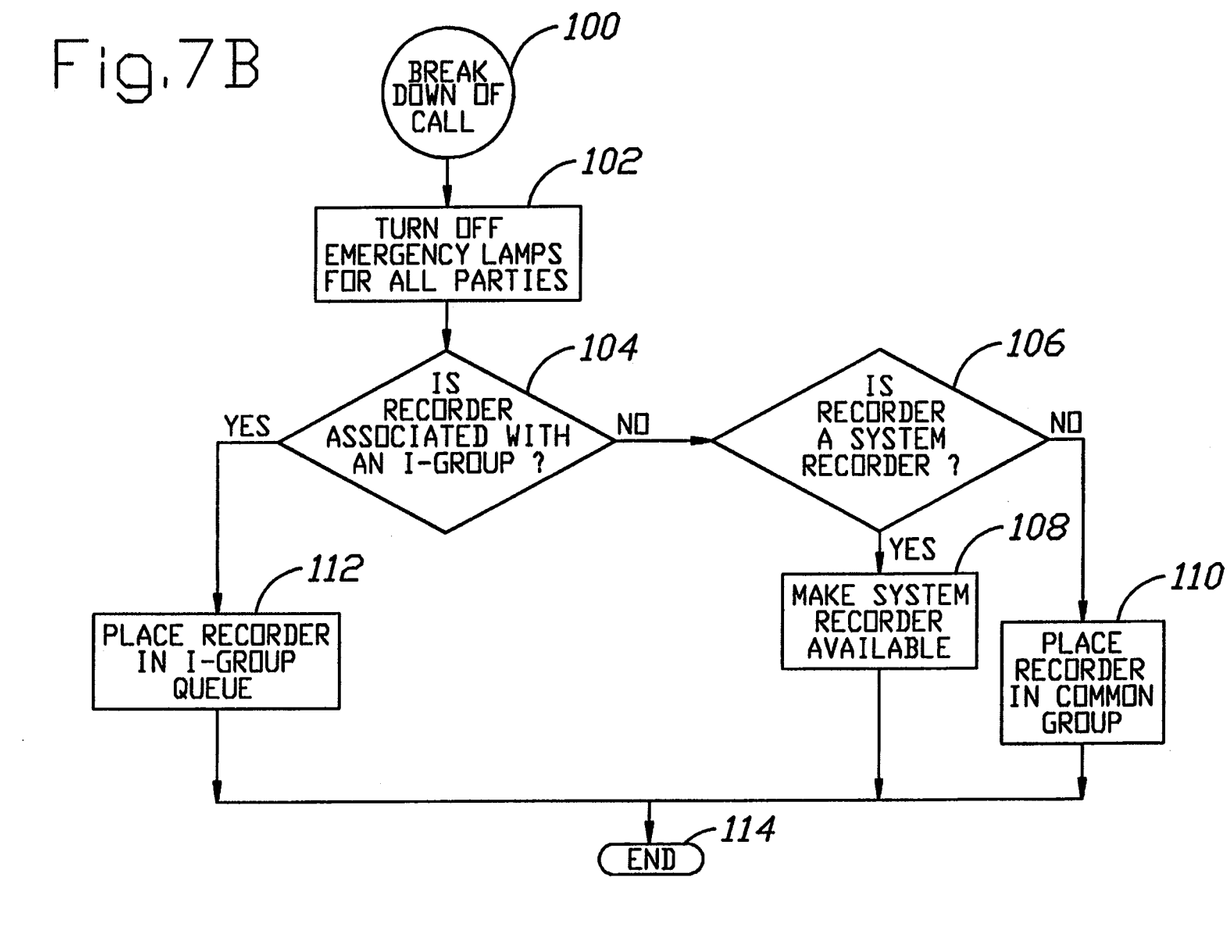

In step 62, if the operator of the requesting unit 16, FIG. 1, or another party connected to the call wishes to release or terminate the recording of an emergency call by depressing the emergency key 32, FIG. 2, during the recording of a call, the system 10 initiates a breakdown of the emergency call in step 100, FIGS. 7A and 7B. In step 102, FIG. 7B, the emergency lamps 36, FIG. 2, on the consoles 30 of the units 16, FIG. 1, for all the parties connected to the recorded call are turned off. However, if the depressing of the emergency key 32 is done by an operator at a unit 16 other than the requesting unit, the recording of the connected call is maintained between the requesting unit and all other parties including the other unit. Therefore, termination of the recording is only performed at the requesting unit. In step 104, FIG. 7B, the system 10 determines if the recorder 18 is associated with an informational group. The selected signaling recorder 18 is placed back into the appropriate location in the queue of its group. If there is an associated informational group with the signaling recorder 18, FIG. 1, then the recorder is placed at the end of the queue for the group of recorders corresponding to the informational group of the requesting unit 16 and the pointers to the recorder are updated as seen in step 112, FIG. 7B. The pointers are updated by looking at the recorder ID in the port termination table for the signaling recorders ahead and behind the selected recorder 18 in the queue. The port termination table for each signaling recorder 18, FIG. 3, has the Id of the recorder ahead and behind of it in the queue. When a recorder is added to the queue the port termination table is changed to indicate the location of the new recorder in queue. If the selected recorder FIG. 1, is not associated with an informational group, then the system 10 determines if the recorder is a system recorder 20 in step 106, FIG. 7B. If the selected recorder is a system recorder 20, in step 108, FIG. 7B, this recorder is made available and the recording of the call ends, step 114. If it is not a system recorder 20, in step 110 the signaling recorder 18 is returned to its appropriate location within the queue at the common group, group zero, FIG. 3, and the pointers to the recorder are updated. The recording of the call ends in step 114, FIG. 7B.

The computer program stored in memory 24 to insure the central processing unit 22 and used to implement the algorithm of FIGS. 7A and 7B and generally to implement the method of the invention is preferably that listed in the detailed design program document attached hereto as Exhibit A.

While a detailed description of the preferred embodiment of the invention has been given, it should be appreciated that many variations can be made thereto without departing from the scope of the invention as set forth in the appended claims.

We claim:

1. In an automatic call distribution system for selectively interconnecting a total plurality of internal units of an internal network with a plurality of external units of an external telephonic network, the improvement being an emergency recording system, comprising:
a plurality of recorders interconnected with associated ports of the multiport switch;
means for selectively establishing a plurality of informational groups of the internal units;
means for selectively associating at lease some of the plurality of informational groups with at least some of the recorders;
means associated with at least one of the units of the informational groups of internal units for requesting recording of a call at the requesting unit; and
means responsive to a request for recording from one of the internal units of the informational groups of units to selectively assign the associated recorder to the one internal unit.

2. The automatic call distribution system of claim 1 including
means for placing the plurality of recorders associated with some of the informational groups of internal units, when not in use, in a queue of available recorders of the informational groups of internal units.

3. The automatic call distribution system of claim 2 in which said selectively assigning means includes means for accessing the queue on a last in, first out basis.

4. The automatic call distribution system of claim 1 in which the recording requesting means associated with the at least one internal unit includes a manually actuatable emergency key attached to the internal unit for requesting a recording.

5. The automatic call distribution system of claim 4 including means responsive to actuation of the emergency key of the requesting unit when a recording is in process for terminating the recording of the call at the requesting unit.

6. The automatic call distribution system of claim 5 including means for turning off said emergency lamp in response to the termination of the recording of the call.

7. The automatic call distribution system of claim 4 in which the recording requesting means includes
an emergency lamp attached to the internal unit, and
means for lighting the emergency lamp in response to actuation of the emergency key to request recording.

8. The automatic call distribution system of claim 7 including
means for interconnecting a plurality of internal units with an incoming call from an external unit, and
a plurality of emergency lights respectively attached to a plurality of internal units, and
means for lighting all the emergency lamps of the internal units connected to the incoming call in response to actuation of the emergency key on the requesting unit.

9. The automatic call distribution system of claim 7 including
another emergency key with another emergency lamp of another one of the internal units, and
means for recording a call connected between the requesting unit and the other one of the internal units.

10. The automatic call distribution system of claim 9 including means responsive to the actuation of the other emergency key of the other internal unit for turning off the other emergency lamp despite continuation of the recording of the call connected between the requesting unit and the other unit.

11. The automatic call distribution system of claim 1 including
means for establishing a queue of recorders for each informational group of internal units, and
means for inserting a recorder into the queue.

12. The automatic call distribution system of claim 11 in which the inserting means includes means for storing information relating to at least one of (a) the type of recorder placed into queue, (b) a port number of the switch connected to the inserted recorder and (c) the informational group of internal units corresponding to the inserted recorder.

13. The automatic call distribution system of claim 1 including means for displaying an emergency signal at one of the plurality of internal units other than a requesting unit in response to the requesting unit requesting a recording of the call.

14. The automatic call distribution system of claim 13 in which the stored information includes all of the stored information of (a), (b), (c) and (d).

15. In an automatic call distribution system having a multiport switch for selectively interconnecting a total plurality of internal units of an internal network with a plurality of external units of an external telephonic network, the improvement being an emergency recording system, comprising:
at least one recorder interconnected with at least a port of the multiport switch;
means for selectively establishing at least one informational group of the internal units lesser in number than the total plurality of internal units;
means for selectively associating the at least one informational group with the at least one recorder;
means associated with at least one of the units of the informational group of internal units for requesting recording of a call at the requesting unit; and
means responsive to a request for recording from one of the internal units of the informational group of units associated with the at least one recorder to selectively assign the at least one recorder to the one internal unit, and in which the at least one recorder selectively assigned to an informational group is selected based upon its physical proximity to the internal units of the informational group to which it is assigned.

16. In an automatic call distribution system having a multiport switch for selectively interconnecting a total plurality of internal units of an internal network with a plurality of external units of an external telephonic network, the improvement being an emergency recording system, comprising:

at least one recorder interconnected with at least a port of the multiport switch;

means for selectively establishing at least one informational group of the internal units lesser in number than the total plurality of internal units;

means for selectively associating the at least one informational group with the at least one recorder;

means associated with at least one of the units of the informational group of internal units for requesting recording of a call at the requesting unit;

means responsive to a request for recording from one of the internal units of the informational group of units associated with the at least one recorder to selectively assign the at least one recorder to the one internal unit;

at least one additional recorder interconnected with a port of the multiport switch and associated with the at least one informational group of internal units; and means for placing the recorders associated with the at least one informational group of internal units, when not in use, in a queue of available recorders of the at least one informational a group of internal units with means for maintaining a double linked list of pairs of the available recorders respectively arranged as primary and backup recorders.

17. In an automatic call distribution system having a multiport switch for selectively interconnecting a total plurality of internal units of an internal network with a plurality of external units of an external telephonic network, the improvement being an emergency recording system, comprising:

at least one recorder interconnected with at least a port of the multiport switch;

means for selectively establishing at least one informational group of the internal units lesser in number than the total plurality of internal units;

means for selectively associating the at least one informational group with the at least one recorder;

means associated with at least one of the units of the informational group of internal units for requesting recording of a call at the requesting unit;

means responsive to a request for recording from one of the internal units of the informational group of units associated with the at least one recorder to selectively assign the at least one recorder to the one internal unit;

a common pool of recorders which are unassigned to the at least one informational group of units; and means responsive to a recorder unavailability condition upon request by a requesting one of the plurality of internal units of a selected informational group to interconnect an available recorder from the common pool of recorders to the requesting one of the plurality of internal units.

18. In an automatic call distribution system having a multiport switch for selectively interconnecting a total plurality of internal units of an internal network with a plurality of external units of an external telephonic network, the improvement being an emergency recording system, comprising:

a plurality of recorders for recording incoming calls from external units;

means for selectively interconnecting available ones of the plurality of recorders upon request to selected ones of the plurality of internal units; and means for storing information concerning the recording of a call in response to the request for recording by the selected ones of the plurality of internal units.

19. The automatic call distribution system of claim 18 in which the recording information storing means includes a paper printer for printing the information for storage.

20. The automatic call distribution system of claim 18 in which the stored information includes at least one of (a) a time the recording was requested, (b) a telephone number of the requesting internal unit, (c) a requesting unit port identification number of the requesting internal unit, and (d) a recorder port identification number of the recorder which records the call.

21. The automatic call distribution system of claim 18 in which the stored information includes an indication of whether no recorder was available to record the call.

22. In an automatic call distribution system having a multiport switch for selectively interconnecting a total plurality of internal units of an internal telephonic network with a plurality of external units of an external telephonic network, the improvement being a method of recording emergency calls comprising the steps of:

selectively establishing a plurality of informational groups of internal units;

selectively associating at least some of a plurality of recorders with at least some of the plurality of informational groups;

requesting recording of a call at one of the plurality of internal units; and selectively assigning one of the plurality of the recorders to the internal unit requesting recording in response to the request for recording only if the internal unit requesting the recording is in the informational group associated with the one of the plurality of recorders.

23. The emergency call recording method of claim 22 including the step of recording a call with a recorder assigned to the requesting unit.

24. The emergency call recording method of claim 23 including the step of placing the recorder out of service in response to an unsuccessful voice path connection between the recorder and the requesting unit.

25. The emergency call recording method of claim 22 in which the step of selectively associating includes the step of selectively associating a group of recorders of which the at least one recorder is a member, and arranging the group of recorders in a queue of available recorders.

26. The emergency call recording method of claim 25 in which the step of arranging includes the step of placing a recorder of the group in the queue of available recorders in response to termination of a recording by one of a plurality of internal units.

27. The emergency call recording method of claim 22 in which the step of selectively associating includes the step of assigning a group of recorders to each of a plurality of informational groups of internal units.

28. The emergency call recording system of claim 22 in which the step of requesting recording of a call at an unternal unit includes the step of actuating an emergency key at the requesting unit to initiate recording.

29. The emergency call recording system of claim 28 including the step of lighting an emergency lamp at the requesting internal unit in response to actuation of the emergency key at the requesting unit to record the call.

30. The emergency call recording method of claim 29 including the step of lighting the emergency lamps at all the internal units connected to a call in response to actuation of the emergency key at the requesting unit to record the call.

31. The emergency call recording method of claim 28 includes the step of terminating the recording of a call in response to actuation of the emergency key the requesting unit while recording of the call is in process.

32. The emergency call recording method of claim 31 including the step of
turning off an emergency lamp at a requesting unit in response to terminating the recording of the call.

33. The emergency call recording method of claim 32 including the steps of
turning off another emergency lamp of another internal unit in response to actuation of the other emergency key at the other units, and
maintaining the recording of the call connected between the requesting unit and the other unit after the emergency lamp has been turned off.

34. The emergency call recording method of claim 22 in which the step of selectively assigning includes the step of
obtaining an available recorder from a group of recorders associated with the informational group of the requesting unit.

35. The emergency call recording method of claim 22 including the steps of removing the recorder from a queue of available ones of the group of recorders by resetting pointers on the removed recorder.

36. The emergency call recording method of claim 22 including the step of connecting the requesting unit to the recorder.

37. In an automatic call distribution system having a multiport switch for selectively interconnecting a total plurality of internal units of an internal telephonic network with a plurality of external units of an external telephonic network, the improvement being a method of recording emergency calls comprising the steps of:
selectively establishing at least one informational group of internal units lesser in number than the total plurality of internal units;
selectively associating at least one recorder with at least one informational group;
requesting recording of a call at an internal unit;
selectively assigning the at least one recorder to the internal unit requesting recording in response to the request for recording only if the internal unit requesting the recording is in the informational group associated with the at least one recorder;
selectively associating at least one recorder in a group of recorders of which the at least one recorder is a member with at least one informational group;
arranging the group of recorders in a queue of available recorders in a double linked list of primary and backup available recorders; and
placing a recorder of the group in the queue of available recorders in response to termination of a recording by one of a plurality of internal units.

38. In an automatic call distribution system having a multiport switch for selectively interconnecting a total plurality of internal units of an internal telephonic network with a plurality of external units of an external telephonic network, the improvement being a method of recording emergency calls comprising the steps of:
selectively establishing at least one informational group of internal units lesser in number than the total plurality of internal units;
selectively associating at least one recorder with at least one informational group;
requesting recording of a call at an internal unit;
selectively assigning the at least one recorder to the internal unit requesting recording in response to the request for recording only if the internal unit requesting the recording is in the informational group associated with the at least one recorder;
selectively associating at least one recorder of a group of recorders of which the at least one recorder is a member with at least one informational group;
arranging the group of recorders in a queue of available recorders; and
assigning available recorders from the queue on a last in, first out basis.

39. In an automatic call distribution system having a multiport switch for selectively interconnecting a total plurality of internal units of an internal telephonic network with a plurality of external units of an external telephonic network, the improvement being a method of recording emergency calls comprising the steps of:
selectively establishing at least one informational group of internal units lesser in number than the total plurality of internal units;
selectively associating at least one recorder with at least one informational group;
requesting recording of a call at an internal unit; and
selectively assigning the at least one recorder to the internal unit requesting recording in response to the request for recording only if the internal unit requesting the recording is in the informational group associated with the at least one recorder;
selectively associating at least one recorder with at least one informational group;
assigning a group of recorders to each of a plurality of informational groups of internal units;
establishing a common pool of recorders unassociated with any informational group of units; and
connecting an available recorder from the common pool to the requesting unit in response to a recorder unavailability condition of the group of recorders associated with the informational group of the requesting unit.

40. The emergency call recording method of claim 39 including the step of connecting the requesting unit to a system recorder in response to no recorders being available from the common pool of recorders upon request.

41. The emergency call recording method of claim 40 including the step of connecting the requesting unit to a backup system recorder in response to an unsuccessful connection with the system recorder.

42. The emergency call recording method of claim 41 including the steps of
turning off an emergency lamp at the requesting unit in response to no backup system recorder being available, and
storing a report indicating the failure of a recorder being connected to the requesting unit upon request.

43. In an automatic call distribution system having a multiport switch for selectively interconnecting a total plurality of internal units of an internal telephonic network with a plurality of external units of an external telephonic network, the improvement being a method of recording emergency calls comprising the steps of:

selectively establishing at least one informational group of internal units lesser in number than the total plurality of internal units;

selectively associating at least one recorder with at least one informational group;

requesting recording of a call at an internal unit;

selectively assigning the at least one recorder to the internal unit requesting recording in response to the request for recording only if the internal unit requesting the recording is in the informational group associated with the at least one recorder;

returning a recorder to an appropriate location in a queue of the group of recorders after termination of recording; and updating a plurality of pointers to the recorder.

44. In an automatic call distribution system having a multiport switch for selectively interconnecting a total plurality of units of an internal telephonic network with a plurality of external telephonic network, the improvement being a method of recording emergency calls comprising the steps of:

selectively recording different incoming calls from external units on a plurality of different recorders; and automatically storing an emergency message relating to the recording of the call in response to the request for recording at the requesting unit, wherein the step of storing an emergency message includes the step of storing information about at least one of (a) a time and a date the recording was requested, (b) a telephone number of the requesting unit, (c) a requesting unit port identification number and (d) a recorder port identification number of the recorder which records the call, and the step of storing information concerning an unanswered request for recording.

45. The emergency call recording method of claim 44 in which the step of automatically storing includes printing an emergency message.

* * * * *